Aug. 4, 1936.  J. I. BOOTH ET AL  2,049,798
AUTOMATIC BRAKE GEAR FOR MECHANICALLY PROPELLED VEHICLES
Filed March 21, 1935  3 Sheets-Sheet 2
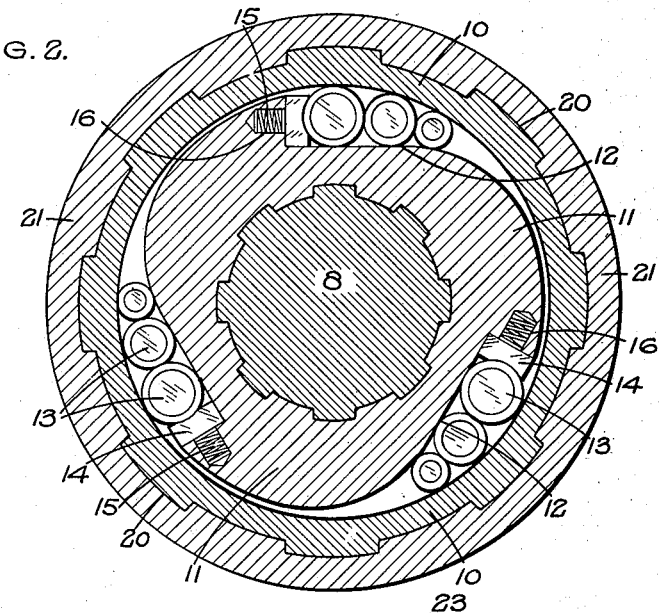
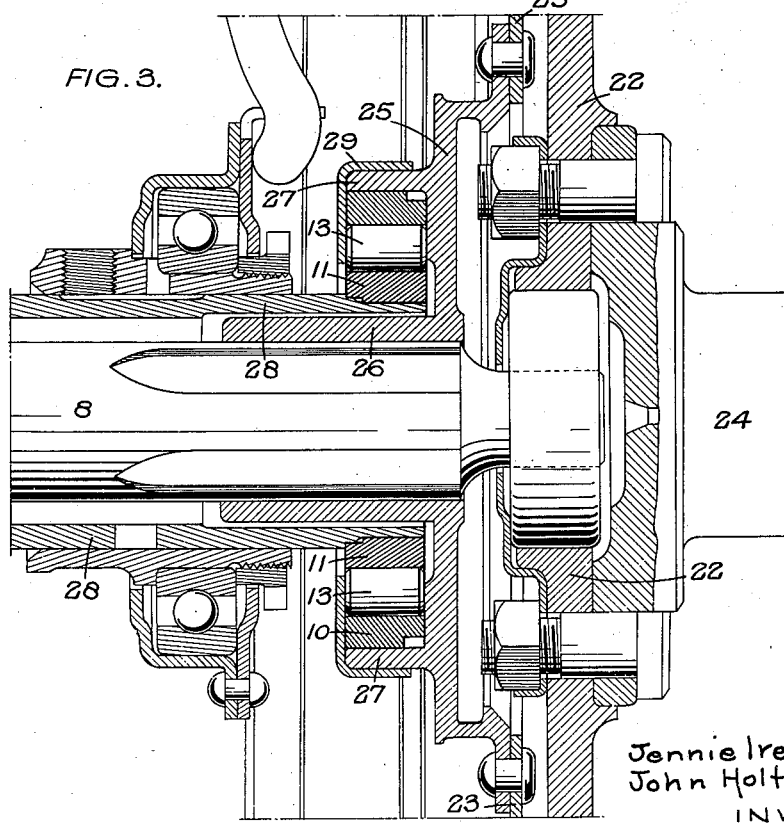
Jennie Irene Booth
John Holt Booth
INVENTORS

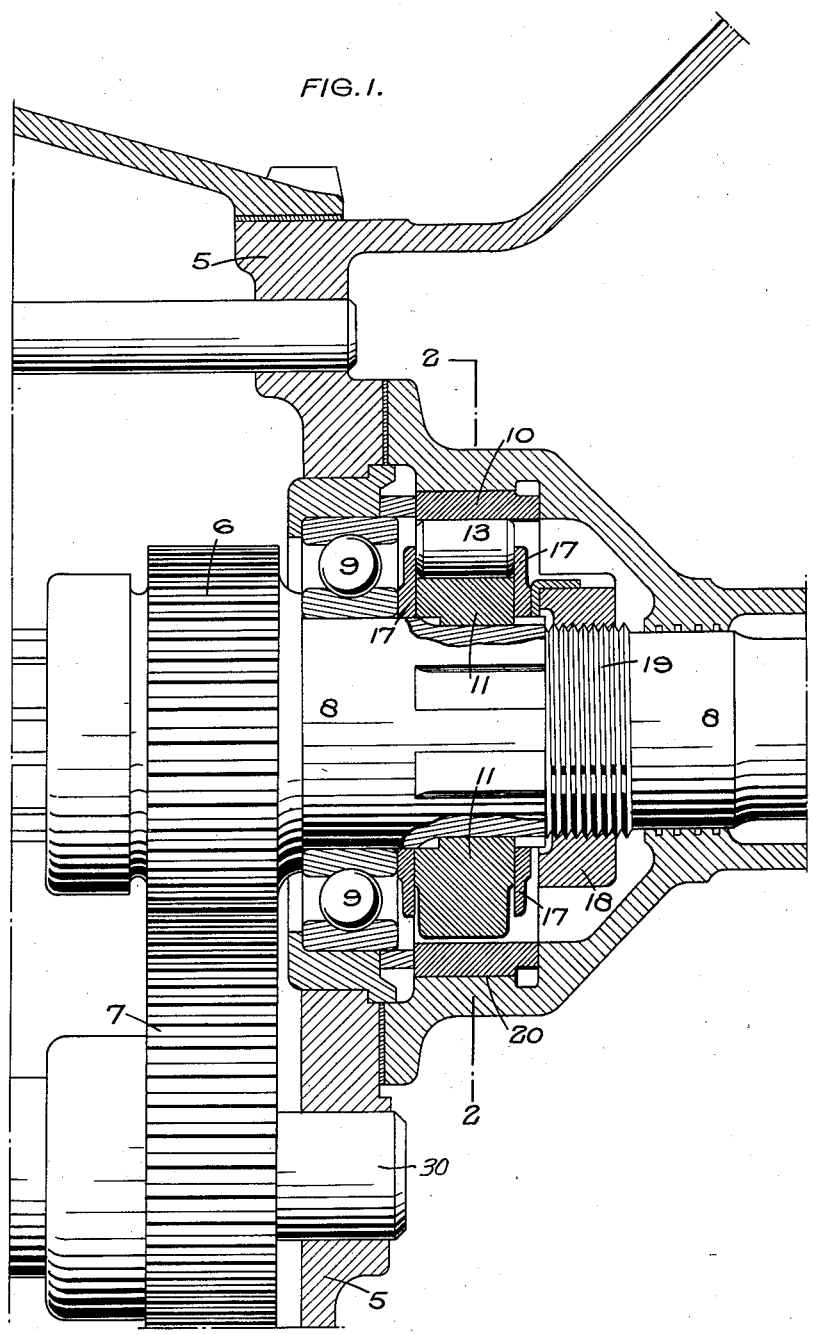

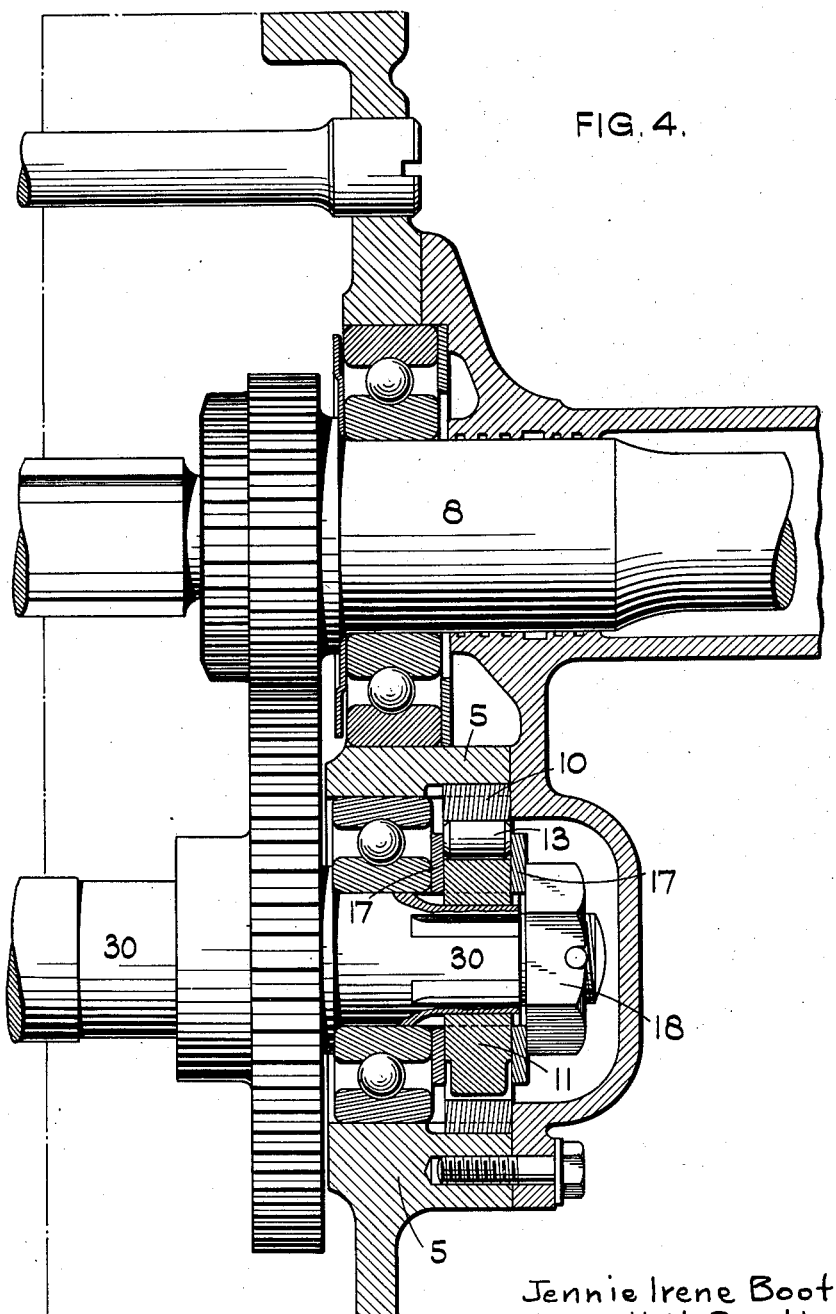

Patented Aug. 4, 1936

2,049,798

UNITED STATES PATENT OFFICE 2,049,798

AUTOMATIC BRAKE GEAR FOR MECHANICALLY PROPELLED VEHICLES

Jennie Irene Booth and John Holt Booth, Four Oaks, Sutton Coldfield, England, assignors of one-third to said John Holt Booth, one-third to Arthur Sam Cheston, Birmingham, England, and one-third to Herbert Linwood Sleigh, Birmingham, England Application March 21, 1935, Serial No. 12,162
In Great Britain March 24, 1934

6 Claims. (Cl. 188—30)

This invention relates to automatic brake gear for mechanically propelled vehicles. One of the objects of the present invention is the provision of means on such vehicles whereby automatic spragging or braking of the vehicle when stationary is obtained whether the engine is running or not.

A further object of the present invention is to provide automatic brake gear which will be positive and infallible in action, and which will permit of the vehicle being driven either forwards or in reverse in the usual way, the automatic brake gear always being in operation, and it being unnecessary to switch it in and out of use.

Further objects of, and advantages obtained by the use of our invention are hereinafter described.

According to the present invention, in a motor road vehicle we provide in the drive and on a uni-directional shaft between the engine or propelling unit and the propeller or cardan shaft, a one-way brake unit or free wheel device, one member of which is in driving engagement with the said uni-directional shaft, and the other member of which is anchored against rotation, the said one-way brake unit permitting of the rotation of the uni-directional shaft in its predetermined direction, and preventing it from rotating in the opposite direction.

By a uni-directional shaft we mean a shaft which always rotates in the same direction whether the vehicle is moving forwardly or in reverse.

The one-way brake unit may operate on the shaft connecting the friction clutch to the gear box, hereinafter referred to as the clutch shaft, and one member of the one-way brake unit may be secured to this clutch shaft, while the other member is anchored to a non-rotary portion of the gear box or to a housing bolted to the front of the gear box.

Alternatively, the one-way brake unit may be located in or adjacent the friction clutch, and one member may be carried by a sleeve keyed or splined to the clutch shaft, which sleeve also carries the driven member of the clutch, the other member being secured to a non-rotary housing or part.

Referring to the drawings:—

Figure 1 is a section showing a portion of the gear box of a motor vehicle with the present invention applied thereto.

Figure 2 is a section on line 2—2 of Figure 1.

Figure 3 is a section through a modification as applied to the friction clutch of a motor vehicle with the invention applied thereto.

Figure 4 is a section of a slight modification.

In the construction illustrated in Figures 1 and 2, the invention is applied to the end of a gear box of the type commonly used with motor vehicle drive units, and the speed reduction or change speed gearing is mounted in the gear box 5, one pair of engaging gears being shown at 6 and 7, and further gearing being mounted within the gear box as is well known.

The shaft 8 upon which the gear 6 is mounted is a transmission shaft connecting the gear 6 to the friction clutch of the drive unit, this shaft being hereinafter referred to as the clutch shaft and being rotatably mounted in a bearing 9 in the end of the gear box.

Upon this clutch shaft 8 is mounted a one-way brake unit or free wheel device comprising an annular outer member 10 and a centre member 11 with a plurality of wedging members disposed therebetween and adapted to permit relative rotation between the members 10 and 11 in one direction but to prevent such rotation in the opposite direction.

The centre member comprises a disc splined to the shaft 8 and provided on its outer periphery with three tangential faces 12 which extend into the member to form three stepped recesses or pockets in the periphery.

Within each of these pockets three wedging members are arranged, each wedging member comprising a roller 13, and the diameters of the rollers in each pocket being graduated to form a wedging train which acts between the tangential face and the inner periphery of the annular member 10.

Behind each train is provided a follower block 14 acted upon by a spring 15 located in a hole 16 in the end face of the stepped recess in the member 11.

The member 11 and the wedging rollers 13 are retained in position by end plates 17, and are secured on the clutch shaft 8 by means of a ring nut 18 engaging a screw threaded portion 19 on the shaft.

The annular member 10 has a number of splines 20 engaging corresponding splines in a casing or housing 21 bolted to the end of the gear box 5.

The disposition of the wedging rollers and the tangential faces 12 is such that free rotation of the member 11 is permitted in the direction in which the clutch shaft 8 transmits the driving power of the engine, namely, in a clockwise direction seen in Figure 2, but rotation of the member 11 in the opposite direction, namely, anti-clockwise in Figure 2, is prevented by the rollers 13 riding up the tangential face 12 and wedging between this face and the inner periphery of the annular member 10. It is thus impossible for the clutch shaft to be rotated either by the engine or by the vehicle in the direction opposite to that normal for the running of the engine.

In the modification illustrated in Figure 3, the one-way brake unit of the form described above is applied to the friction clutch of a motor vehicle drive, and in this construction the flywheel of the vehicle is indicated at 22, the movable or flexible clutch plate at 23, and the transmission shaft between the flywheel and the engine at 24.

To the clutch plate 23 is attached a housing 25 having a sleeve 26 which is engaged over and splined or keyed to the opposite end of the clutch shaft to that shown in Figure 1.

This housing is formed with an annular extension or collar 27, into which is splined the annular member 10 of the one-way brake unit, whilst the centre member 11 is splined to an extension or sleeve 28 on the casing or housing 21 shown in Figure 1.

Trains of wedging rollers 13 are provided between the members 10 and 11 as described with reference to Figures 1 and 2, and these rollers are retained in position by means of a sheet metal cover 29 engaged over the extension or collar 27.

In this construction the centre member is secured to a non-rotary portion of the brake unit, whilst the outer annular member is splined to the member transmitting the drive to the gear box, but the operation of the device exactly corresponds with that described above, and the leading and trailing faces of the member 11 are arranged as described with reference to Figure 2, so that rotation of the clutch shaft in the desired direction is permitted, whilst the device prevents rotation in the opposite direction.

In the functioning of a device constructed in accordance with this invention, engagement of any forward or reverse speed gearing in the gear box causes engagement of the whole transmission mechanism from the clutch to the road wheels, and any tendency of the latter to rotate the transmission mechanism in the direction opposite to that permitted or desired is resisted by the one-way device as described above.

The vehicle is consequently prevented from running backwards if any forward gear is engaged, or from running forward if a reverse gear is engaged irrespective of whether the friction clutch is engaged or not when the engine is stationary, or if the clutch is disengaged when the engine is running.

Thus if the vehicle is brought to rest upon a hill or incline, the device according to the present invention prevents the vehicle running backwards down the hill or incline as long as a forward gear is engaged, and if it is desired to bring the vehicle to rest upon a hill or incline, the driver has only to release the clutch when the vehicle will come to rest and will be held stationary without the application of the hand or foot brake. When it is desired to proceed again up the hill, the driver has only to re-engage the clutch and accelerate in order to resume progress, and attention to the hand or foot brake is unnecessary and eliminated.

A further advantage is that reverse running of the engine is prevented when starting up, since the engine cannot rotate the transmission shafts in the direction reverse to that obtaining in normal running, the one-way brake device being operative since the clutch is normally engaged when the engine is being started up.

Thus injury or damage due to back-firing or reverse running is prevented.

A further feature of the device according to this invention is that its incorporation does not interfere in any way with the functioning of the known type of transmission free wheel mechanism frequently fitted to motor vehicles in the transmission between the gear box and the driven axle, such free wheel mechanism being provided to permit over-running of the driven end of the power transmission system relative to the driving end thereof.

In the modification shown in Figure 4 the device illustrated in Figures 1 and 2 including centre member 11, outer member 10 and rollers 13 is mounted to act on the constant mesh wheel shaft 30 of the gear box instead of on the shaft 8 and in this case the member 11 is connected to one end of the constant mesh wheel shaft 30, the other member 10 being anchored to a casing fixed to the gear box 5.

What we claim then is:—

1. In a motor road vehicle the combination of a clutch shaft, a stationary housing around said shaft, a sleeve on said clutch shaft, a clutch plate attached to said sleeve, and a one-way brake device comprising inner and outer members mounted one in driving engagement with said clutch shaft and the other secured to said housing, said inner member having a number of substantially tangential faces and the outer member having an arcuate face co-operating with said tangential faces to form a number of wedge shaped pockets and a train of wedging members in each of said pockets permitting relative rotation between said inner and outer members in one direction but arresting relative rotation in the reverse direction, one member of which is fixed to said sleeve, and the other of which is fixed on said housing.

2. In a motor road vehicle the combination of a clutch shaft, a stationary housing around said shaft, a sleeve on said clutch shaft, a clutch plate attached to said sleeve, and a one-way brake device comprising an inner ring fixed to said stationary housing and an outer ring fixed to said clutch plate, said inner ring having a number of substantially flat faces and the outer ring having an arcuate face co-operating with said flat faces to form a number of wedge shaped pockets and a train of wedging rollers in each of said pockets permitting relative rotation between said inner and outer rings in one direction but arresting relative rotation in the reverse direction.

3. In a motor road vehicle the combination of a clutch shaft, a stationary housing around said shaft, a sleeve on said clutch shaft, a clutch plate attached to said sleeve, a collar on said clutch plate extending concentrically around the end of said stationary housing, an inner ring mounted on the end of said stationary housing, an outer ring mounted in said collar, said inner ring being cut away to form with the inner face of said outer ring a number of wedge shaped pockets and a train of wedging members in each of said pockets permitting relative rotation between said inner and outer rings in one direction but arresting relative rotation in the reverse direction.

4. In a motor road vehicle the combination of a clutch shaft, a stationary housing around said shaft, a sleeve on said clutch shaft, a clutch plate attached to said sleeve, said stationary housing having a cylindrical end portion extending concentrically around said sleeve, a cylindrical collar on said clutch plate disposed concentrically around said end of said housing, an outer ring secured within said collar, an inner ring secured to said end of said housing, said inner ring being shaped at its outer peripheral face to form with the inner surface of said outer ring a number of wedge shaped pockets and a train of wedging rollers in each of said pockets permitting relative rotation between said inner and outer rings in one direction but arresting relative rotation in the reverse direction.

5. In a motor road vehicle according to claim 4 the provision of an inner ring having a number of faces disposed substantially tangentially in relation to said clutch shaft, each of said faces cutting into the peripheral surface of said inner ring to form a pocket or recess.

6. In a motor road vehicle the combination of a clutch shaft, a stationary housing around said shaft, a sleeve on said clutch shaft, a clutch plate attached to said sleeve, an end portion of said housing extending concentrically around said sleeve, a collar on said clutch plate extending concentrically around said end of said housing in spaced relationship therewith, an inner ring secured to said end of said housing, an outer ring secured in said collar, said inner and outer rings co-operating to form a number of wedge shaped pockets, a train of wedging rollers in each of said pockets permitting relative rotation between said inner and outer rings in one direction but arresting relative rotation in the reverse direction and a cover mounted on said collar to form a partial closure for the outer end of said wedge shaped pockets.

JENNIE IRENE BOOTH.
JOHN HOLT BOOTH.